Patented Nov. 30, 1948

2,455,159

UNITED STATES PATENT OFFICE 2,455,159

PURIFICATION OF TETRAHYDROFURFURYL ALCOHOL CONTAINING FURFURAL AND FURFURYL ALCOHOL AS IMPURITIES

John George Mackay Bremner and David Gwyn Jones, Norton-on-Tees, England, assignors to Imperial Chemical Industries Limited, a corporation of Great Britain No Drawing. Application February 3, 1947, Serial No. 726,230. In Great Britain February 27, 1946

12 Claims. (Cl. 260—345)

This invention relates to the treatment of tetrahydrofurfuryl alcohol to remove undesired impurities therefrom.

In processes using tetrahydrofurfuryl alcohol as a starting material, the presence of impurities, and in particular of furfural and of furfuryl alcohol, is undesirable. For example, in the production of dihydropyran by the catalytic dehydration of tetrahydrofurfuryl alcohol as described in British Specification No. 547,334 the presence of small quantities of furfural and/or of furfuryl alcohol leads to a diminution in the activity of the basic aluminium phosphate catalyst used.

According to the present invention there is provided a process for the removal of furfural or furfuryl alcohol from tetrahydrofurfuryl alcohol containing either substance substantially in the absence of the other, there being present not more than 10% by weight of furfural or not more than 15% by weight of furfuryl alcohol, or for the removal of furfural and furfuryl alcohol from tetrahydrofurfuryl alcohol containing both substances in amounts respectively of not more than 5% by weight, which comprises treating the tetrahydrofurfuryl alcohol with an acidic substance, or with a substance which under the conditions of treatment gives rise to an acidic substance, subsequently separating tetrahydrofurfuryl alcohol.

It is undesirable to apply the process of the present invention to tetrahydrofurfuryl alcohol containing undue proportions of either furfural or furfuryl alcohol, one being present in the absence of the other, as treatment with an acidic substance, or with a substance giving rise to an acidic substance, leads to the production of a gel and/or products from which it is difficult to recover tetrahydrofurfuryl alcohol. With tetrahydrofurfuryl alcohol containing more than 5% by weight of each of the substances furfural and furfuryl alcohol, treatment according to the process of the present invention leads to the production of a gel from which it is difficult to recover the tetrahydrofurfuryl alcohol. The application of the process of the present invention to tetrahydrofurfuryl alcohol containing such concentrations of furfural and furfuryl alcohol is therefore to be avoided.

Examples of acidic substances suitable for use according to the present invention are acids and acid salts. Also, salts which, under the conditions used in the process of the present invention, give rise to acidic substances, may be used. More specifically examples of suitable acidic substances are sulphuric, hydrochloric, sulphamic and p-toluene sulphonic acids and alkali metal hydrogen sulphates. Examples of suitable salts are aluminium chloride and boron trifluoride monohydrate. The quantity of acidic substance or of salt giving rise thereto may vary over wide limits. When treating tetrahydrofurfuryl alcohol containing either furfural or furfuryl alcohol in the absence of the other, we have found it suitable to use a quantity not greater than 10% by weight of the impure tetrahydrofurfuryl alcohol, although larger or smaller quantities may be used if desired. When both furfural and furfuryl alcohol are present, it is preferred to use a proportion by weight of acidic substance, or of salt giving rise thereto, no greater than the combined weights of the furfural and furfuryl alcohol in the impure tetrahydrofurfuryl alcohol. The treatment may be carried out over a wide range of temperature, but it is convenient to carry it out at the boiling point of the mixture containing acidic substance and tetrahydrofurfuryl alcohol to be treated.

Atmospheric pressure, increased or reduced pressure may be used as desired.

The acidic substance or salt giving rise thereto may be mixed with tetrahydrofurfuryl alcohol to be treated and the mixture may be heated for a time at a temperature below its boiling point at the prevailing pressure, for example 20° C. below this boiling point, before recovering the tetrahydrofurfuryl alcohol. Alternatively the mixture may be boiled at the prevailing pressure under a reflux condenser for a time before recovering the tetrahydrofurfuryl alcohol. After these treatments the tetrahydrofurfuryl alcohol may be recovered by distillation, if desired, after neutralisation of the acidic substance, for example with the hydroxide or carbonate of an alkali metal or of an alkaline earth metal. In this neutralisation step it is desirable to add sufficient neutralising agent to render the mixture alkaline. Instead of heating for some time, the mixture of acidic substance and tetrahydrofurfuryl alcohol as above described, the mixture may be distilled immediately to obtain a distillate of tetrahydrofurfuryl alcohol substantially free from furfural and furfuryl alcohol. If the tetrahydrofurfuryl alcohol is to be recovered by distillation, it is in general desirable to use an acidic substance which is non-volatile under the conditions of operation and which does not decompose to give products which would contaminate the distillate.

By suitable arrangement of a heated mixing vessel and a distillation apparatus with the interposition, if desired, of means for neutralising the acidic substance, the treatment of tetrahydrofurfuryl alcohol according to the present invention may be carried out as a continuous process.

Alternatively, after heating the mixture of acidic substance and impure tetrahydrofurfuryl alcohol, the mixture may be treated for the removal of the reaction products of furfural and furfuryl alcohol with an absorption substance such as fuller's earth or activated clay. This treatment may be followed by neutralisation of the acidic substance and distillation to obtain tetrahydrofurfuryl alcohol. It will be understood that this method of operation may be adapted for operation as a continuous process.

Example 1

Tetrahydrofurfuryl alcohol containing 0.3% by weight of furfural and 10% by weight of furfuryl alcohol was refluxed with 2% of its weight of p-toluene sulphonic acid under reduced pressure for 6 hours, the temperature being 130° C. The mixture was then distilled to give a tetrahydrofurfuryl alcohol containing 0.066% by weight of furfural and less than 2% by weight of furfuryl alcohol.

Example 2

Tetrahydrofurfural alcohol containing 4% by weight of furfural was refluxed with 2% of its weight of p-toluene sulphonic acid for 3 hours at atmospheric pressure and then distilled. The tetrahydrofurfuryl alcohol obtained contained 0.03% of furfural.

We claim:

1. A method of treating tetrahydrofurfuryl alcohol to remove impurities therefrom; said impurities being from the group consisting of: (a) furfural in an amount not exceeding 10% and in the absence of furfuryl alcohol; (b) furfuryl alcohol in an amount not exceeding 15% and in the absence of furfural; and, (c) both furfural and furfuryl alcohol in amounts not exceeding 5% each, said amounts being expressed as percentages by weight of the untreated tetrahydrofurfuryl alcohol comprising heating said untreated material in the liquid phase with an acidic substance in an amount not exceeding 10% by weight of said untreated material at a temperature not exceeding the boiling point of the resulting mixture, and recovering tetrahydrofurfuryl alcohol from said mixture.

2. The method of claim 1 wherein said heating operation is effected at a temperature not exceeding the boiling point of the mixture and not lower than 20° C. below said boiling point.

3. The method of claim 2 wherein the acidic substance is an acid.

4. The method of claim 2 wherein the acidic substance is p-toluene sulfonic acid.

5. The method of claim 2 wherein the acidic substance is an acid salt.

6. The method of claim 2 wherein the acidic substance is aluminum chloride.

7. The method of claim 2 wherein the tetrahydrofurfuryl alcohol is recovered by distillation.

8. The method of claim 2 wherein the mixture resulting from the heat treatment is neutralized and then distilled to recover tetrahydrofurfuryl alcohol.

9. The method of claim 2 wherein the mixture resulting from the heat treatment is contacted with an agent which adsorbs from said mixture reaction products of said impurity formed as a result of said treatment.

10. A method of treating tetrahydrofurfuryl alcohol to remove impurities therefrom; said impurities being from the group consisting of: (a) furfural in an amount not exceeding 10% and in the absence of furfuryl alcohol; (b) furfuryl alcohol in an amount not exceeding 15% and in the absence of furfural; and, (c) both furfural and furfuryl alcohol in amounts not exceeding 5% each, said amounts being expressed as percentages by weight of the untreated tetrahydrofurfuryl alcohol, comprising adding to said untreated tetrahydrofurfuryl alcohol a substance which is acidic in the presence thereof in an amount not exceeding 10% by weight thereof, refluxing the resulting liquid mixture and then neutralizing the mixture and recovering tetrahydrofurfuryl alcohol therefrom.

11. The method of claim 10 wherein the substance added to the untreated tetrahydrofurfuryl alcohol is p-toluene sulfonic acid.

12. The method of claim 10 wherein the substance added to the untreated tetrahydrofurfuryl alcohol is aluminum chloride.

JOHN GEORGE MACKAY BREMNER.
DAVID GWYN JONES.

REFERENCES CITED

The following references are of record in the file of this patent:

UNITED STATES PATENTS

| Number | Name | Date |
|--------|------|------|
| 1,337,523 | Leslie et al. | Apr. 20, 1920 |
| 1,665,237 | Trickey et al. | Apr. 10, 1928 |
| 2,345,966 | Fielder et al. | Apr. 4, 1944 |
| 2,423,389 | Jordon | July 1, 1947 |

OTHER REFERENCES

Zanetti, Journal of Amer. Chem. Soc., vol. 50, page 1821 (1928).